United States Patent [19]
Tokiwa et al.

[11] Patent Number: 5,963,524
[45] Date of Patent: Oct. 5, 1999

[54] OPTICAL DISK APPARATUS

[75] Inventors: Kazunori Tokiwa, Hachiouji; Kenichi Horikiri, Zama; Hirokazu Iida, Kawagoe, all of Japan

[73] Assignee: Kabushiki Kaisha Kenwood, Tokyo, Japan

[21] Appl. No.: 08/859,708

[22] Filed: May 21, 1997

[30] Foreign Application Priority Data

Jun. 6, 1996 [JP] Japan .................................. 8-168590

[51] Int. Cl.[6] ........................................................ G11B 7/00
[52] U.S. Cl. ............................ 369/58; 369/44.25; 369/94
[58] Field of Search .................................. 369/58, 44.25, 369/94, 124, 112, 47, 44.37

[56] References Cited

U.S. PATENT DOCUMENTS

| | | | |
|---|---|---|---|
| 5,682,372 | 10/1997 | Yamakawa et al. | 369/44.25 |
| 5,721,718 | 2/1998 | Hwang | 369/44.25 |
| 5,790,493 | 10/1996 | Takeya et al. | 369/58 |
| 5,808,983 | 6/1996 | Tsutsui et al. | 369/44.25 |
| 5,835,460 | 12/1995 | Nishikata | 369/44.25 |

*Primary Examiner*—Nabil Hindi
*Attorney, Agent, or Firm*—Sixbey, Friedman, Leedom & Ferguson, PC; Eric J. Robinson

[57] ABSTRACT

An optical disk apparatus capable of automatically setting a pickup lens suitable for an optional optical disk selected from a plurality of optical disks having different thicknesses. Current flowing through an actuator is detected with a detector circuit, A/D converted, and supplied to a controller. The controller detects the in-focus positions at the surface and reflection film of an optical disk in accordance with an FOK signal and an FZC signal, calculates the current values flowing through the actuator at the in-focus positions, and judges the thickness of the optical disk in accordance with a difference between the current values.

2 Claims, 10 Drawing Sheets

OPTICAL DISK APPARATUS

BACKGROUND OF THE INVENTION

1. Field of the Invention

The present invention relates to an optical disk apparatus, and more particularly to an optical disk apparatus capable of discriminating a loaded optical disk from a plurality of optical disks having different thicknesses and selecting a pickup lens most suitable for the discriminated optical disk.

2. Description of the Related Art

A conventional optical disk apparatus for data recording, reproducing and erasing has: an optical focussing system in which a laser beam is focussed via a pickup lens to a loaded optical disk, and light reflected from the optical disk is detected with a photodetector; and a focus pull-in control system having an actuator for converging the laser beam to the optical disk.

Figure 7:
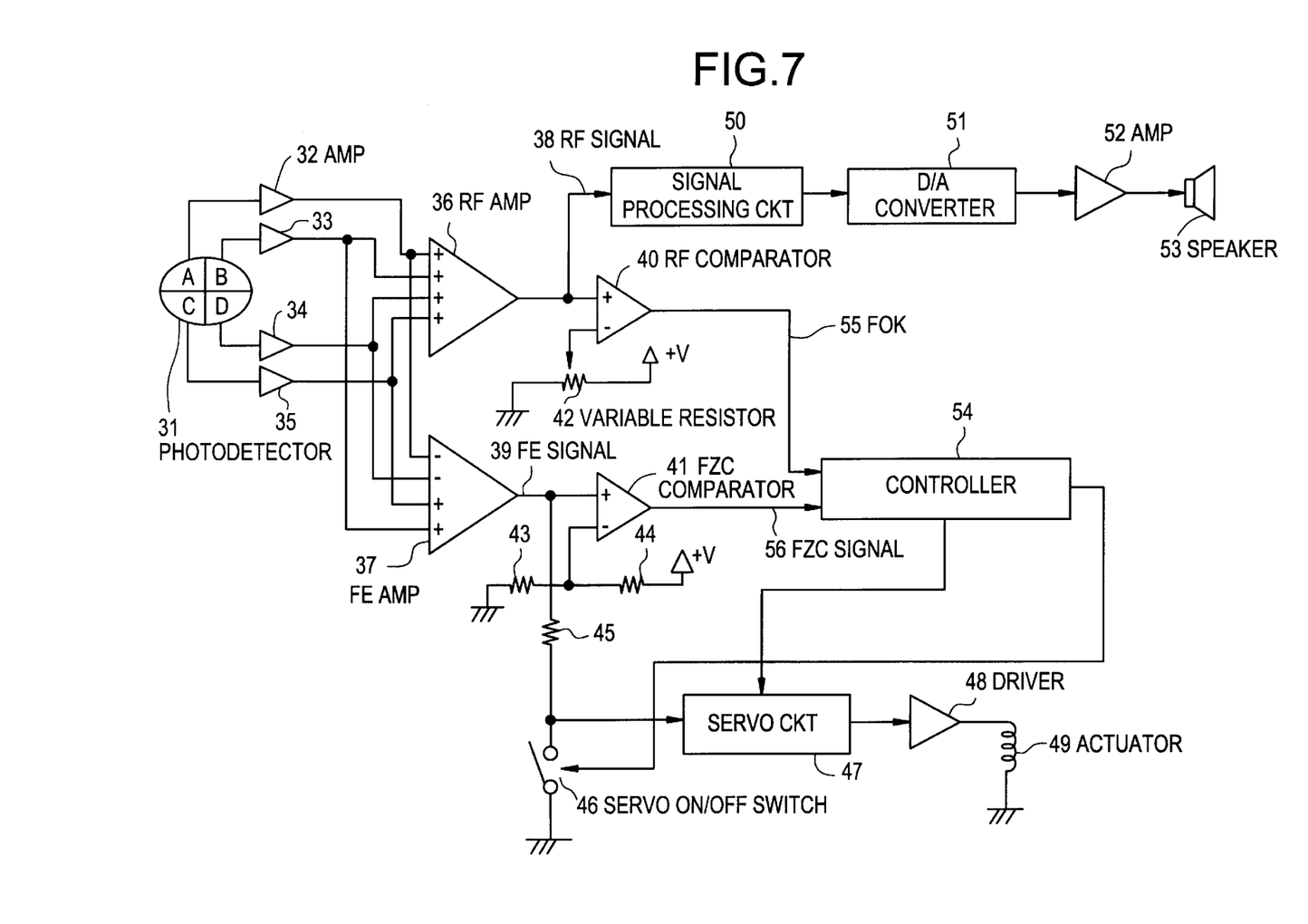
FIG. 7 is a block diagram showing the structure of a conventional optical disk apparatus.

FIG. 7 is a block diagram showing the structure of such a conventional optical disk apparatus. This optical disk apparatus has: a photodetector 31 having a total of four unit elements A, B, C and D; amplifiers 32, 33, 34 and 35 for amplifying respective signals detected with the unit elements A, B, C and D; an RF amplifier 36 for amplifying a sum of all the outputs of the amplifiers 32, 33, 34 and 35; a focus error (hereinafter abbreviated as FE) amplifier 37 for amplifying a sum of the outputs of the amplifiers 33 and 35 subtracted by a sum of the outputs of the amplifiers 32 and 34; a signal processing circuit 50 for processing an RF signal 38 output from the RF amplifier 36 to obtain a necessary signal such as an audio signal; a D/A converter 51 for converting a digital signal output from the signal processing circuit 50 into an analog signal; an amplifier 52 for amplifying an output of the D/A converter 51, and a speaker 53 for receiving an output of the amplifier 52 and producing sounds. The optical disk apparatus further includes: an RF comparator 40 for receiving an RF signal 38 generally called a sum signal as its non-inverting input (+) and a voltage divided by a variable resistor 42 as its inverting input (−) and outputting a focus-ok (FOK) signal 55; an FZC comparator 41 for receiving an FE signal 39 from the FE amplifier 37 as its non-inverting input (+) and a voltage divided by resistors 43 and 44 as its inverting input (−) and outputting a focus zero cross (FZC) signal 56; a servo ON/OFF switch 46, a resistor 45 connected between one end of the switch 46 and an output of the FE amplifier 37; a servo circuit 47 for receiving a signal at the one end of the switch 46 and a signal from a controller 54; a driver 48 for power amplifying a signal output from the servo circuit 47; an actuator 49 connected to an output of the driver 48 and made of a focus coil; and the controller 54 made of a microcomputer for receiving the FOK signal 55 and the FZC signal 56 and controlling the servo system including the switch 46, servo circuit 47, and the like. A combination of the FOK signal and FZC signal is called a focus signal.

The variable resistor 42 is connected between a power source voltage +V and the ground, and is used for controlling an FOK level so that the focus point of a reflection film of the optical disk is detected without detecting the surface of the optical disk. The resistors 43 and 44 are serially connected between the power source voltage +V and the ground, and is used for presetting the bias of the inverting input (−) to a predetermined voltage value so that the zero cross point of the FE signal 39 is correctly detected. The block diagram of FIG. 7 described above is mainly pertains to a focus pull-in control system.

Figure 8:
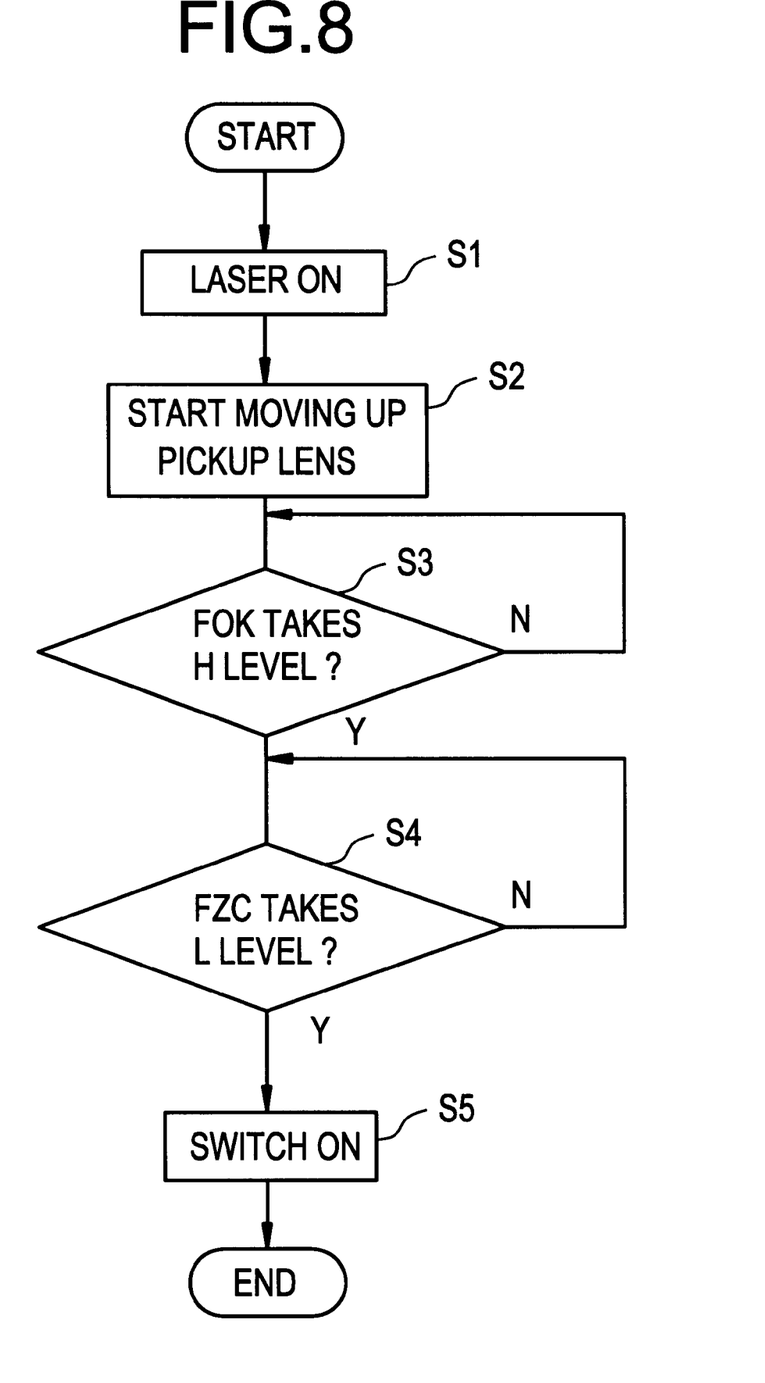
FIG. 8 is a flow chart illustrating a conventional control procedure.
Figure 9:
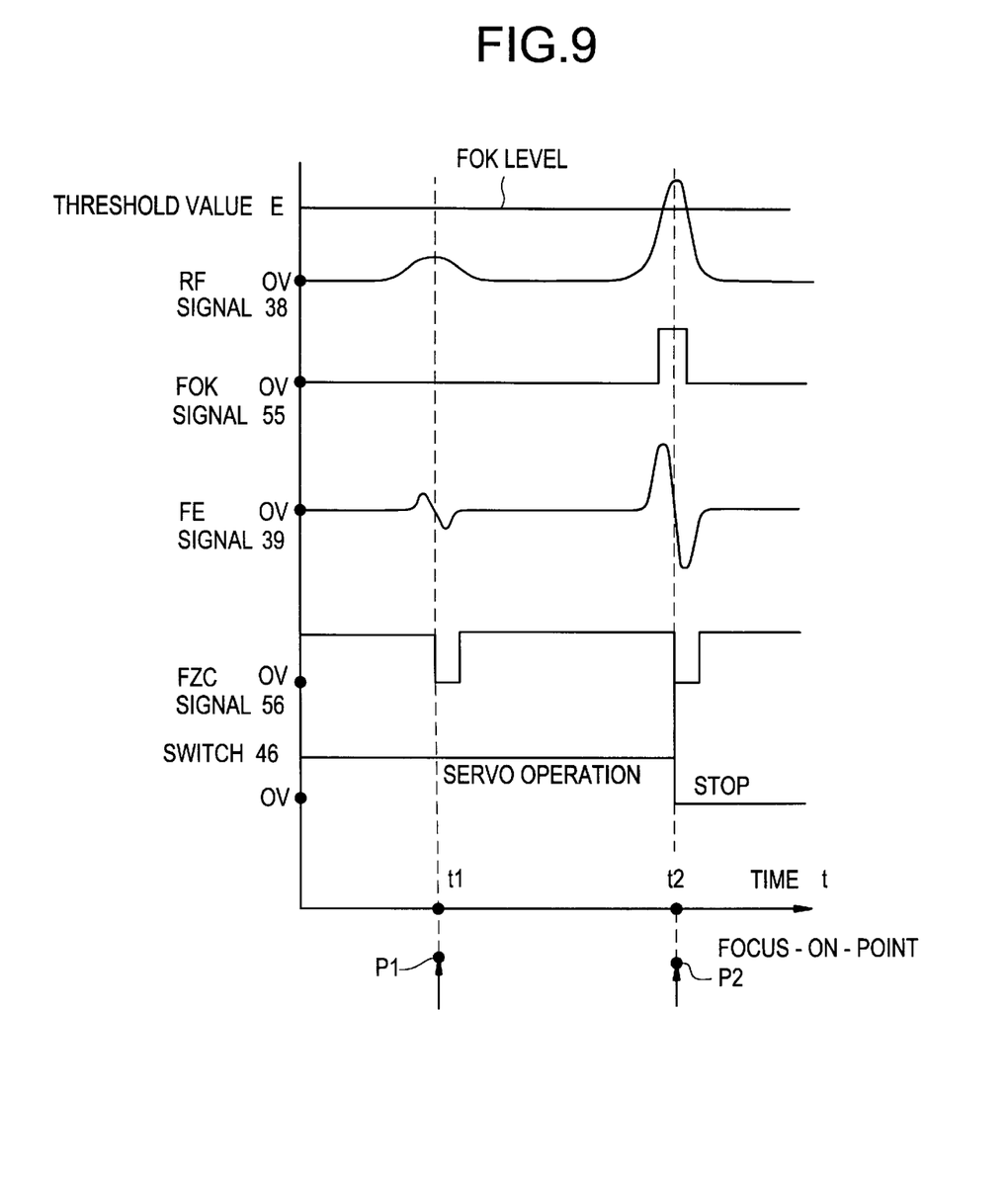
FIG. 9 is a timing chart showing signal waveforms at various circuit portions of the conventional optical disk apparatus performing focus search.

The operation of the optical disk apparatus shown in FIG. 7 will be described with reference to the flow chart of FIG. 8 illustrating the control procedure for the optical disk and with reference to the timing chart of FIG. 9 showing the waveforms of signals at various circuit portions. First, at Step S1 a laser power source is turned on and a laser beam is applied to a loaded optical disk. Next, at Step S2 the focus servo system starts moving up a pickup lens toward the optical disk at a constant speed. Therefore, the in-focus position gradually moves toward the inner region of the optical disk.

In this case, a small peak appears on the RF signal 38 at a position P1 and at a timing t1 when the in-focus position reaches the surface of the optical disk. This small peak waveform has a level of the FOK level or lower set to the RF comparator 40 so that the FOK signal 55 does not change. An S-character or inverted S-character curve appears on the FE signal 39 so that the FZC signal 56 of a negative pulse having a falling edge at the focus zero cross point is output. The two signals, FOK and FZC signals 55 and 56, are collectively called a focus signal as described earlier. This position P1 corresponds to the in-focus position of the optical disk surface. Since it is not meaningless to stop the servo system and fix the focus at this timing, the switch 46 maintains an OFF state so that the servo system continues its operation without advancing to Step S5.

A position P2 at a timing t2 when the FOK signal 55 is detected at Step S3 corresponds to the in-focus position at the reflection layer in the inner region of the optical disk. In this case, since the RF signal 38 has a level higher than the FOK level, an FOK signal 55 is output which is a positive pulse having a width corresponding to the period while the RF signal 38 takes a level higher than the FOK level. In this case, the FE signal 39 has a large S-character impulse which is shaped by the FZC comparator 41 and output as the FZC signal 56 having a falling edge at the zero cross point.

Since the FZC signal 56 takes an L (low) level at Step S4 and the FOK signal 55 takes an H (high) level at Step S3, the flow advances to Step S5 whereat the focus servo loop is closed so that motion of the pickup lens is stopped and the position P2 is established as the focus-on-point which is the in-focus point at the reflection layer.

As the lens is moved at a constant speed, there is a point at which the in-focus is obtained instantaneously. This in-focus point corresponds to the zero cross point while the RF signal 38 is higher than the FOK level and while the amplitude of the focus error signal is lower than a threshold value E. It is known that if the objective lens is positioned in the area corresponding to this period, the focus pull-in can be performed always stably.

In the structure described above, the FOK level is set by the RF comparator 40. There is a case wherein there is only a small difference between the peak values of the RF signals 38 reflected from the surface of an optical disk and from the reflection layer in the inner region of the optical disk. In such a case, the pulse of the FOK signal 55 is generated for both the peak signals of the RF signals. Therefore, the disk surface may be erroneously judged to be the reflection layer surface. Alternatively, the pulse of the FOK signal 55 may not generated for both the peak signals so that the unload state of an optical disk may be erroneously judged. As above, inability of setting a sufficient voltage margin of the FOK level may result in focus pull-in control with less reliability.

Also in the above structure, the focus control is performed by a pickup lens used in common for optical disks of one kind having generally the same focus-on-point. If an optical disk of another kind having a thickness greatly different from the one kind is loaded, it is impossible to use the same lens for the focus control in excess of a refraction limit because of the spherical aberration.

Figure 10A:
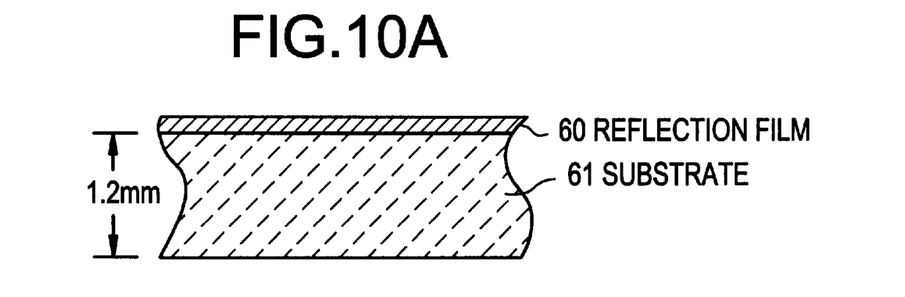
FIGS. 10A to 10C are cross sectional views showing optical disks of different kinds.
Figure 10B:
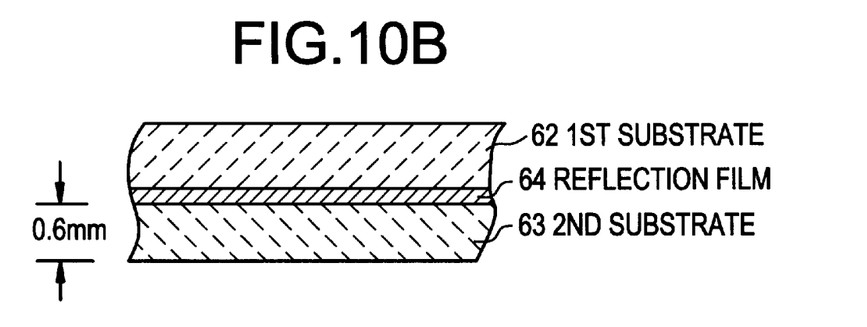
Figure 10C:
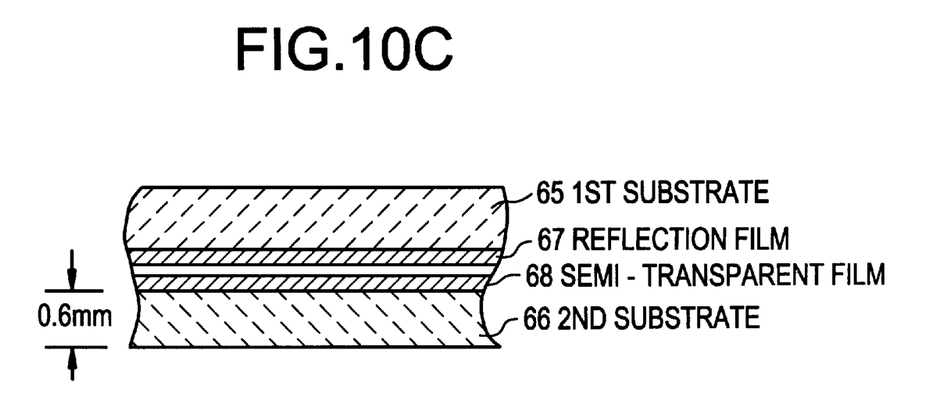

FIGS. 10A to 10C are cross sectional views of optical disks of three kinds. The optical disk shown in FIG. 10A is called a CD (compact disk) having a thickness of about 1.2 mm and an aluminum reflection film 60 formed on the main surface of a polycarbonate substrate 61. An optical disk shown in FIG. 10B is called a DVD (digital versatile disk) having a thickness of about 0.6 mm and an aluminum reflection film 64 formed on the main surface of a second polycarbonate substrate 63 and a first substrate 62 stacked on the surface of the reflection film 64. The optical disk shown in FIG. 10C is called a two-layer DVD having a thickness of about 0.6 mm and a reflection film 67, an intermediate layer (transparent material) and a semi-transparent film 68 interposed between first and second substrates 65 and 66. It is desired to use the same optical disk apparatus for the reproduction and recording of optical disks of three different kinds.

A conventional optical disk apparatus having a function of discriminating between optical disks of a plurality of different kinds is disclosed in Japanese Patent Laid-open HEI 5-54406. This optical disk can discriminate between different kinds of optical disks without using a specific detector, by measuring a disk substrate thickness with measuring means which measures the time interval of two S-character waves on the focus error signal while focus position control means moves the objective lens near to the disk surface.

With this structure, however, the time interval depends on the motion speed of the objective lens. Therefore, if the motion speed fluctuates, the time interval changes even if the disk thickness is the same so that correct measurement of the disk thickness is difficult.

SUMMARY OF THE INVENTION

It is an object of the present invention to provide an optical disk apparatus capable of solving the following issues:

(1) realizing a considerably increased detection voltage margin, without using means for discriminating between a disk surface and a reflection layer by setting the FOK level;

(2) enabling focus control with high reliability;

(3) enabling to load disks having a large thickness difference of the substrate on the same optical disk apparatus for data recording and reproducing;

(4) enabling to load disks including a CD, a DVD and a two-layer DVD on the same optical disk apparatus for data recording and reproducing;

(5) eliminating influence of a lens motion speed change upon thickness measurement; and (6) enabling to quickly discriminate between disk thicknesses even if the substrate thickness is greatly different.

According to one aspect of the present invention solving the above issues, an optical disk apparatus for data recording, reproducing and erasing is provided which has an optical focussing system in which an optional optical disk is selected from a plurality of optical disks of different kinds having different thicknesses and loaded in the optical disk apparatus, a laser beam is focussed via a pickup lens to the loaded optical disk, and light reflected from the loaded optical disk is detected with a photodetector, and having a control system with an actuator for converging the laser beam to the optical disk, the optical disk apparatus comprising: means for detecting a focus signal from the photodetector while the pickup lens is moved by the control system; temporary storage means for storing, as first and second measured values, drive currents or voltages of the actuator representative of the in-focus positions at the surface of the optical disk and at a reflection film of the optical disk, in accordance with the focus signal; subtraction means for calculating a difference of the second measured value from the first measured value; and identifying means for identifying the kind of the optical disk by comparing the calculated difference with a reference value.

DETAILED DESCRIPTION OF THE PREFERRED EMBODIMENTS

Figure 1:
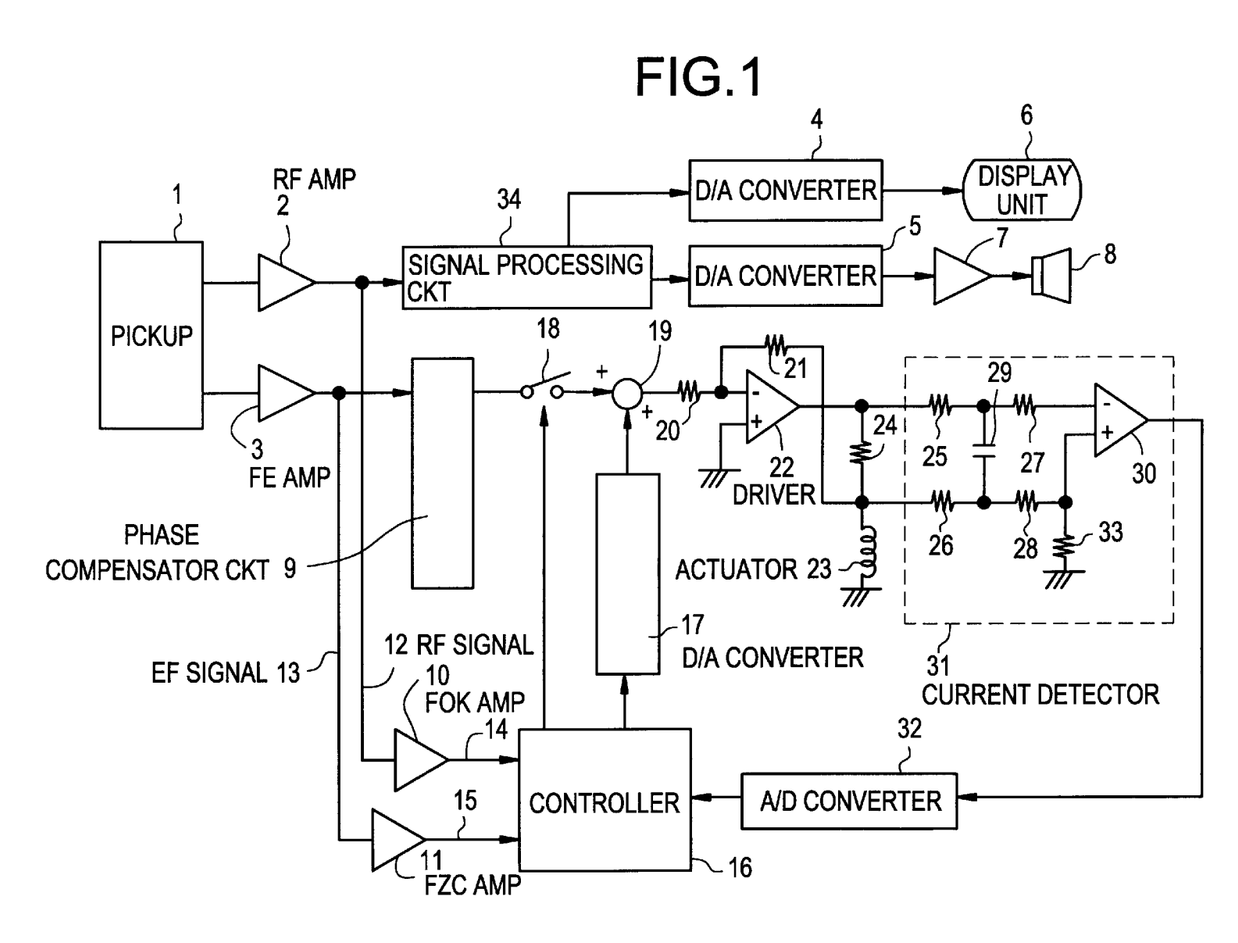
FIG. 1 is a block diagram showing the structure of an optical disk apparatus according to an embodiment of the invention.

An optical disk apparatus according to an embodiment of this invention shown in the block diagram of FIG. 1 is different from the conventional optical disk apparatus shown in the block diagram of FIG. 7, in that the servo system is provided with a current detector circuit 31, that a controller 16 discriminates between optical disks by detecting current or voltage of an actuator of the servo system, and that an FOK level set to an FOK amplifier 10 is low. The other structures are the same as those shown in the block diagram of FIG. 7.

A pickup 1 has the structure, for example, same as that of the photodetector 31 and amplifiers 32, 33, 34 and 35 shown in FIG. 7. RF and FE amplifiers 2 and 3 may be the same as the RF and FE amplifiers 36 and 37. An FOK amplifier 10 for inputting an RF signal 12 and outputting an FOK signal 14 may have the same structure as the RF comparator 40, however, with a different setting value of the variable resistor 42. In this embodiment, in particular, the bias of a variable resistor (not shown) is set so that pulses detecting both the surface and reflection film of an optical disk can be generated as will be described later.

A FZC amplifier 11 for inputting an FE signal 13 and outputting a FZC signal 15 may have the same structure as the FZC comparator 41 and have bias resistors (not shown) same as the bias resistors 43 and 44. The servo system including a phase compensator circuit 9 receiving the RF signal 12, a switch 18 and an adder 19 is controlled by a controller 16. The adder 19 is controlled via a D/A converter 17 for converting a digital value into an analog value. An amplification factor of a power amplifier driver 22 is set by resistors 20 and 21. An output of the driver 22 is supplied via a resistor 24 to an actuator 23 made of a focus coil.

The current detector circuit 31 detects a voltage across the resistor 24 having a predetermined value in order to detect current flowing through the actuator 23. Resistors 25 and 27 are serially connected to an inverting input terminal (−) of a comparator 30, and resistors 26 and 28 are serially connected to a non-inverting input terminal (+) thereof also connected to which is a resistor 33. In order not to amplifier high frequency components such as noises, a capacitor 29 is connected between the common connection point of the resistors 25 and 27 and the common connection point of the resistors 26 and 28.

An analog value output of the comparator 30 is converted by an A/D converter 32 into a digital value which is supplied to the controller 16. The controller 16 is made of a microcomputer and stores therein control programs which are executed in a predetermined order to be described later. The RF signal 12 is supplied to a signal processing circuit 34 which supplies a video signal to a D/A converter 4 and to a display unit 6 and supplies an audio signal to a D/A converter 5 and via a driver 7 to a speaker 8.

The circuit shown in FIG. 1 mainly shows the focus pull-in control system of the optical disk apparatus in which any one of optical disks of different kinds shown in FIGS. 10A to 10C can be loaded.

Figure 2:
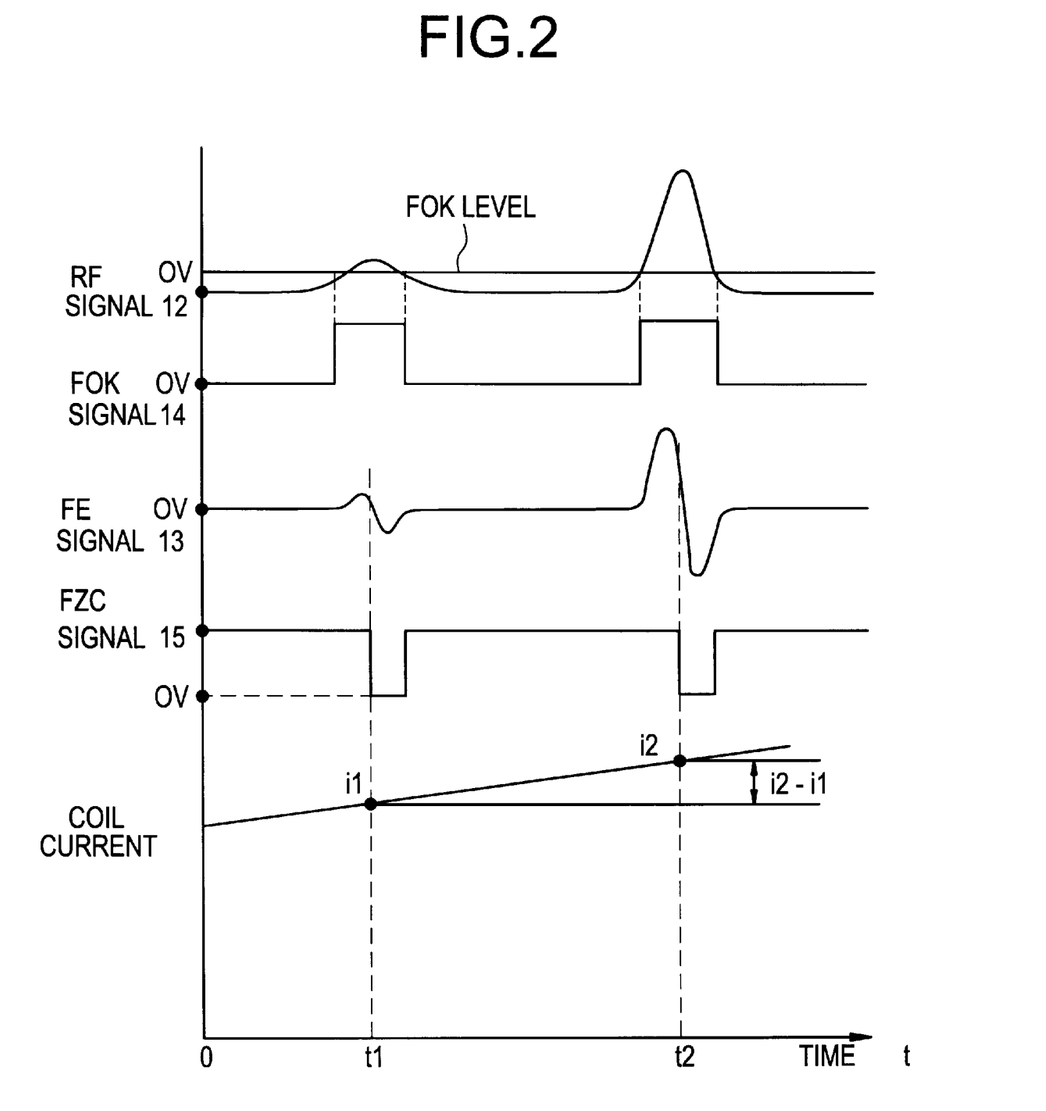
FIG. 2 is a timing chart showing signal waveforms at various circuit portions of the optical disk apparatus of the embodiment, in which focus search is performed for an optical disk of 0.6 mm thick.
Figure 4:
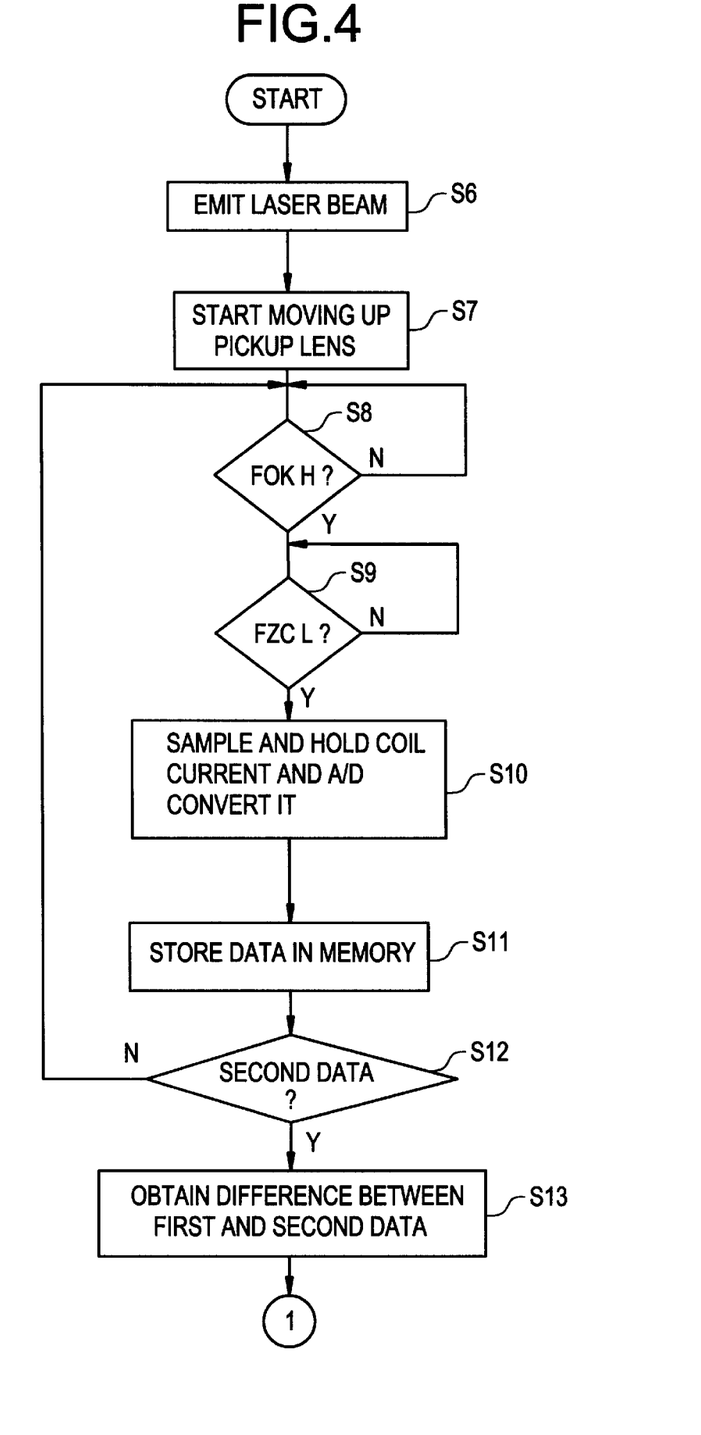
FIG. 4 is a flow chart illustrating the first half portion of the control procedure according to an embodiment of the invention.
Figure 5:
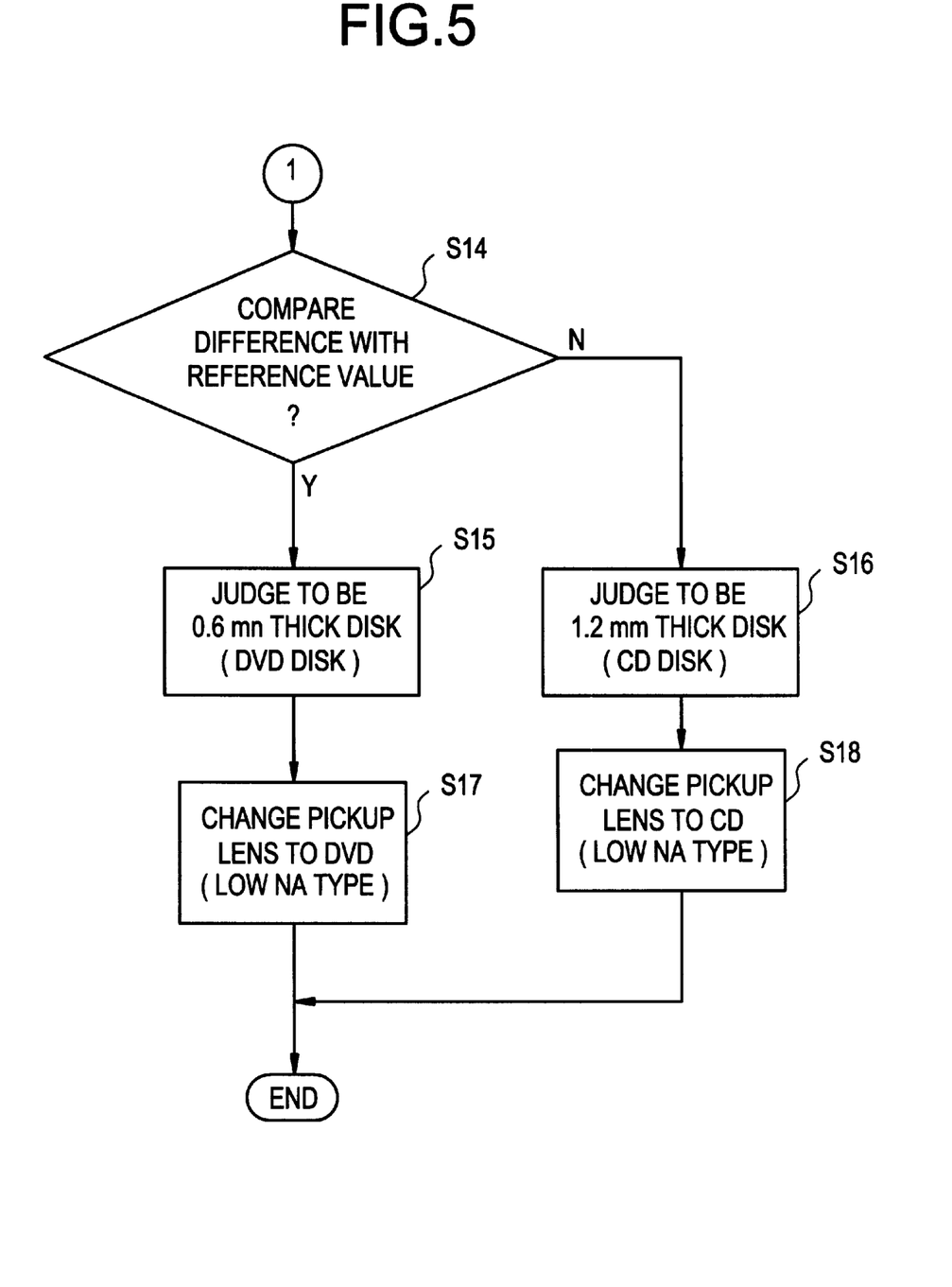
FIG. 5 is a flow chart illustrating the second half portion of the control procedure of the embodiment.

Reference is made to the timing chart of FIG. 2 illustrating the focus search of an optical disk of 0.6 mm thickness and the flow charts of FIGS. 4 and 5 illustrating the procedure of the controller 16. First, at Step S6 a power is turned on to apply a laser beam to an optical disk. Next, at Step S7 the pickup lens is gradually moved up toward the surface of the optical disk.

If an in-focus is obtained at the surface of the optical disk, the RF signal 12 takes a level higher than a preset FOK level so that an FOK signal 14 is obtained which has a pulse width corresponding to the period while the RF signal 12 takes a level higher than the preset FOK level. It is to be noted that the bias of the FOK amplifier 10 is set so that the FOK signal 14 is output also when the in-focus at the optical disk surface is obtained.

The focus error (FE) signal 13 has an S-character impulse (in this case, inverted S-character impulse) which is shaped by the FZC amplifier 11 to obtain an FZC signal 15 having a predetermined pulse width and a falling edge at the zero cross point. These pulse signals satisfy the condition of Step S8 that the FOK signal 14 takes an H (high) level and the condition of Step S9 that the FZC signal takes an L (low) level. At the next Step S10, coil current of the actuator 23 is sampled and held and then A/D converted. At Step S11, this coil current i1 is stored in a memory of the controller 16. It is judged at Step S12 whether the stored current which satisfied the conditions of Steps S8 and S9 is either for the first time (in-focus at the surface of the optical disk) or for the second time (in-focus at the reflection film). If it is judged to be the first time, the flow returns to Step S8.

Next, as the lens is further moved, the RF signal 12 having a larger impulse is obtained when the in-focus at the reflection film of the optical disk is obtained. This RF signal 12 is compared with the FOK level to obtain the FOK signal 14 having a pulse width corresponding to the period while the RF signal 12 takes a level higher than the FOK level. In this case, the FE signal 13 has a larger S-character impulse and an FZC signal 15 is obtained which has a predetermined pulse width and a falling edge at the zero cross point. These pulse signals satisfy the conditions of Steps S8 and S9, and after Step S10, coil current i2 is stored in the memory of the controller 16 at Step S11.

Since the coil current i2 is for the second in-focus at Step S12, the flow advances to Step S13 whereat a current value (i2−i1), i.e., a current difference, is calculated. This current difference is compared at Step S14 with a preset reference value (in this embodiment, a current value corresponding to a thickness of 0.9 mm is used as the reference value). If the current difference is smaller than the reference value, it is judged at Step S15 that the optical disk is an 0.6 mm thick optical disk. If the current difference is lager than the reference value (corresponding to the thickness of 0.9 mm), it is judged at Step S16 that the optical disk is an 1.2 mm thick optical disk. After Step S15, the pickup lens is changed to a DVD (high NA) type to thereafter terminate the procedure.

Figure 3:
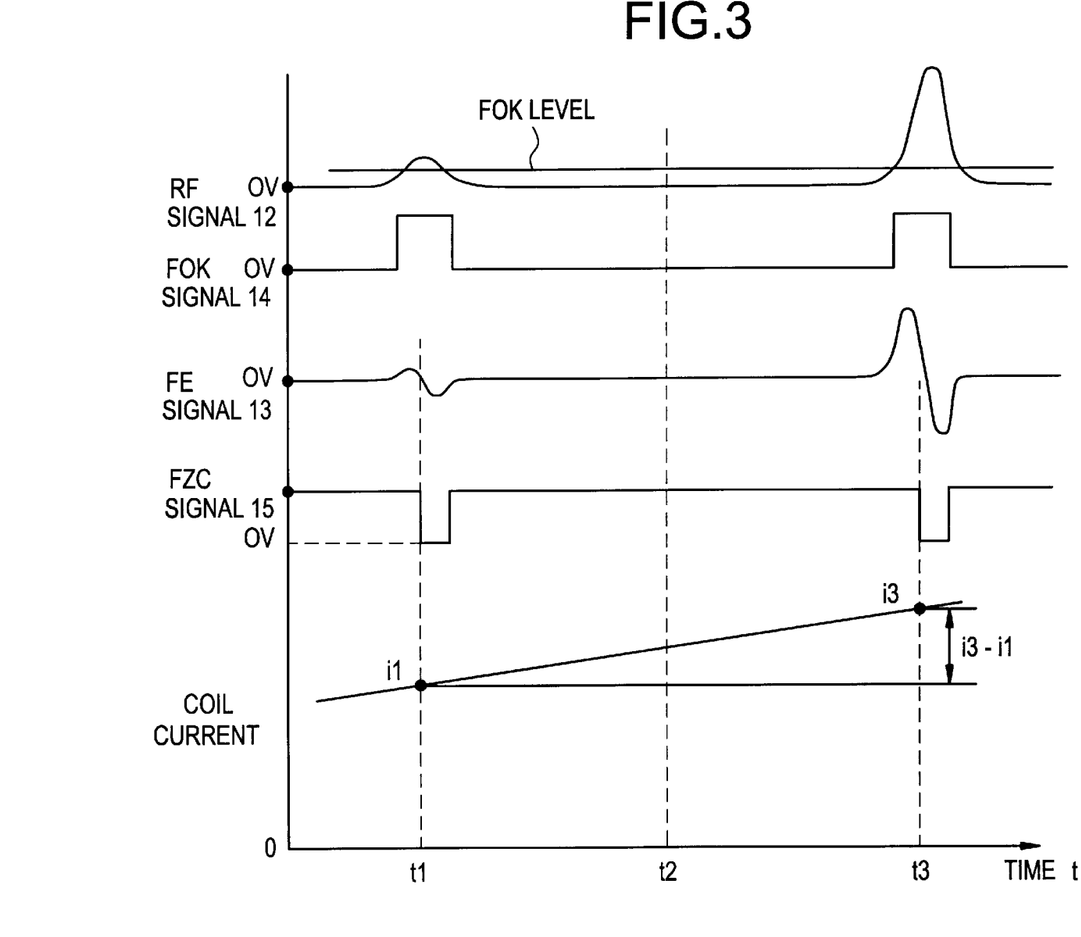
FIG. 3 is a timing chart showing signal waveforms at various circuit portions of the optical disk apparatus of the embodiment, in which focus search is performed for an optical disk of 1.2 mm thick.

Reference is made to the timing chart of FIG. 3 illustrating the focus search of an optical disk of 1.2 mm thickness. Also in this case, the coil current i1 for the in-focus at the surface of the optical disk is detected at time t1, and another coil current i3 for the in-focus at the reflection film is detected. A current difference (i3−i1) is calculated. Since this current difference is larger than the reference value (corresponding to the thickness of 0.9 mm), the flow advances to Steps S16 and S18 to change the pickup lens to the CD (low NA) type to thereafter terminate the procedure.

Although the coil current i3 is smaller than twice the coil current i2, the current difference (i3−i1) is about twice the current difference (i2−i1). Therefore, it is more advantageous to compare the current difference with the reference value and the reliability of the comparison at Step S14 becomes better, because of a lager difference between the two current differences. Furthermore, if an absolute value is used for the comparison therebetween instead of the current difference, this absolute value changes with the mount position of the turntable. In this connection, if the current difference is used, a variation of coil current to be caused by the variation of the mount state of an optical disk can be eliminated.

For selecting a pickup lens at Steps S17 and S18, a plurality of lenses having different numerical apertures NA are prepared for realizing in-focus without any spherical aberration. A plurality of lenses are disposed in plane and controlled to be rotated about one axis to thereby select a suitable one.

Figure 6:
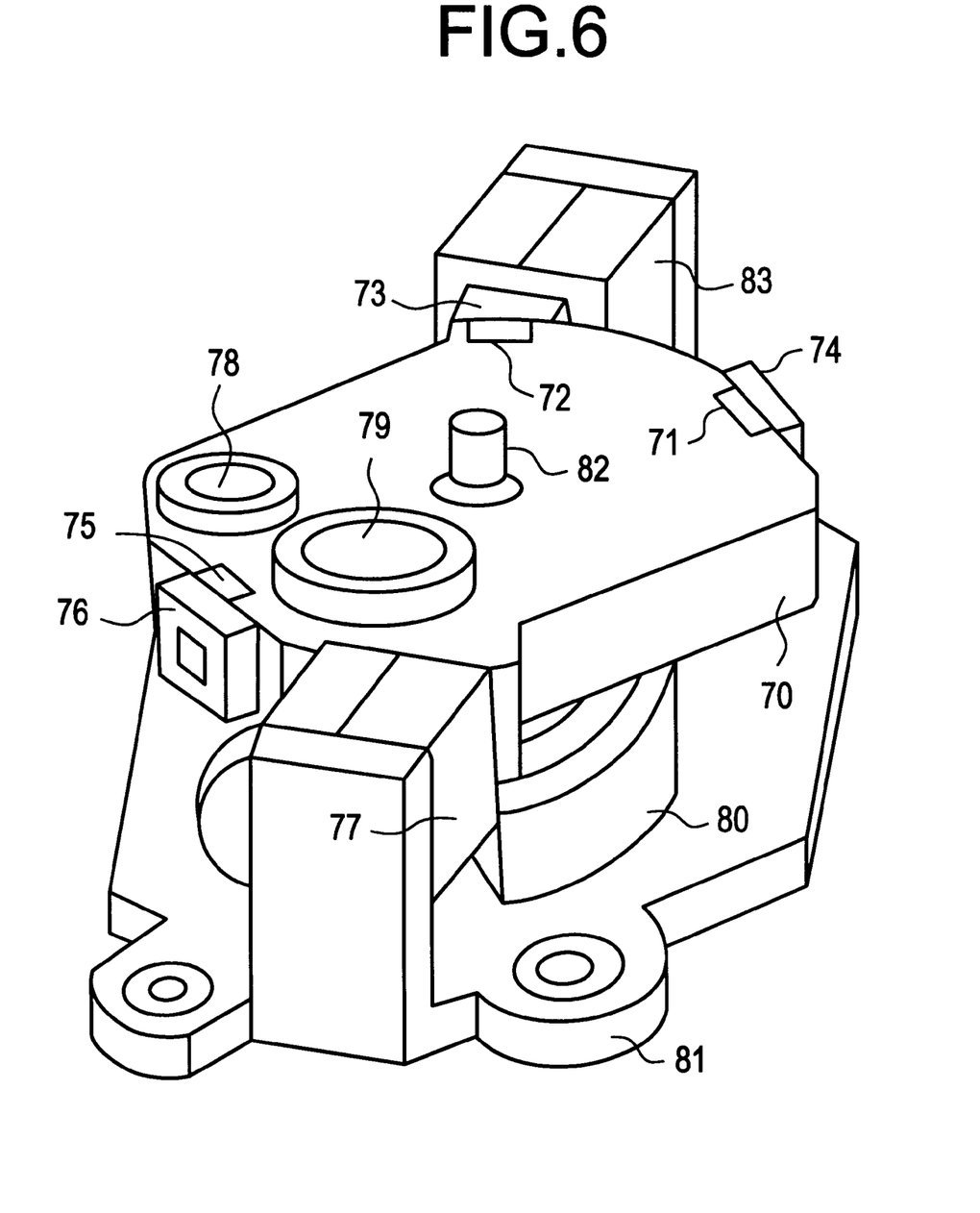
FIG. 6 is a perspective view showing the structure of a pickup used by the embodiment optical disk apparatus.

A pickup of such a twin-lens type is shown in FIG. 6. The pickup shown in FIG. 6 has a lens holder 70 mounted on which are a CD objective lens 78, a DVD objective lens 79, iron pieces 71, 72 and 75, and tracking coils 73, 74 and 76. A focussing magnet 80 is also mounted between a support 81 and the lens holder 70, and tracking magnets 77 and 83 are fixed to the support 81 spaced apart from each other so that the lens holder 70 can rotate freely about a rotary shaft 82. Another iron piece and another tracking coil are also mounted although they are not shown in FIG. 6 because they are at the back of the tracking magnet 77.

While no current flows through the tracking coils 73, 74 and 76 and the like, the iron piece 72 and tracking magnet 81 for example are structured to be attracted each other.

Namely, even if no control voltage is applied, one of the lenses 78 and 79 is set to a normal stage. With this structure, in order to switch between the lenses, a kick pulse is applied to the tracking coil 74 in a short time to generate a repulsion force larger than the attraction force between the magnet 81 and iron piece 72. The lens holder 70 therefore receives a rotation torque and rotates the lens holder 70. After some rotation, the iron piece 71 is attracted to the magnet 81 and fixed to the normal stage. In this manner, the lenses 78 and 79 fixed to the lens holder 70 are selectively switched. In order to recover the position of the original lens, a kick pulse of an opposite polarity is applied to perform a similar control.

At Steps S17 and S18, the switching control only is executed. In this case, means for visually displaying which optical disk was selected may be provided.

In the current detector circuit 31 of this embodiment, the resistor 24 is connected serially to be actuator 23 to measure the current flowing through the actuator 23 by detecting the voltage across the resistor 24 having a presumably constant resistance. This voltage value is supplied via the A/D converter 32 to the controller 16 which converts the voltage value into the current value. Since the voltage value is proportional to the current value, the voltage value itself may be used for comparison. The current detector circuit 31 shown in FIG. 1 is only illustrative and may use known means for directly detecting a current.

As above, since it becomes possible to discriminate between optical disks during the focus search, the lens can be replaced immediately so that the time required for reading actual data can be shortened.

According to the optical disk apparatus of this invention described above, a current difference obtained during the in-focus at the surface and reflection film of an optical disk is used for the discrimination between optical disks. Therefore, discrimination reliability is very high and all the previously described issues can be solved.

What is claimed is:

1. An optical disk apparatus for data recording, reproducing and erasing, the apparatus having an optical focussing system in which an optional optical disk is selected from a plurality of optical disks of different kinds having different thicknesses and loaded in the optical disk apparatus, a laser beam is focussed via a pickup lens to the loaded optical disk, and light reflected from the loaded optical disk is detected with a photodetector, and having a control system with an actuator for converging the laser beam to the optical disk, the optical disk apparatus comprising:

means for detecting a focus signal from the photodetector while the pickup lens is moved by the control system;

temporary storage means for storing, as first and second measured values, drive currents or voltages of the actuator representative of the in-focus positions at the surface of the optical disk and at a reflection film of the optical disk, in accordance with the focus signal;

subtraction means for calculating a difference of the second measured value from the first measured value; and identifying means for identifying the kind of the optical disk by comparing the calculated difference with a reference value.

2. An optical disk apparatus according to claim 1, further comprising means for selecting the pickup lens suitable for the optical disk whose kind was identified by said identifying means.

* * * * *